United States Patent [19]

Abe et al.

[11] Patent Number: 5,427,368
[45] Date of Patent: Jun. 27, 1995

[54] SHEET-LIKE ARTICLE SORT-OUT APPARATUS

[75] Inventors: Yukio Abe; Mikio Tsutsui; Takayuki Yamauchi, all of Obu, Japan

[73] Assignee: Meinan Machinery Works, Inc., Obu, Japan

[21] Appl. No.: 272,754

[22] Filed: Jul. 11, 1994

[30] Foreign Application Priority Data

Aug. 2, 1993 [JP] Japan .................................. 5-210957

[51] Int. Cl.⁶ .............................................. B65H 29/00
[52] U.S. Cl. ..................... 271/283; 271/276; 271/310; 271/197
[58] Field of Search ................. 271/96, 225, 276, 282, 271/283, 284, 303, 308, 310, 197

[56] References Cited

U.S. PATENT DOCUMENTS

| | | | |
|---|---|---|---|
| 3,533,618 | 10/1970 | Carstens | 271/276 |
| 3,774,907 | 11/1973 | Borostyan | 271/310 |
| 4,216,954 | 8/1980 | Kwasnitza | 271/283 |
| 4,261,559 | 4/1981 | Mitzel | 271/276 |
| 4,681,002 | 7/1987 | Nakaya . | |

FOREIGN PATENT DOCUMENTS

| | | |
|---|---|---|
| 29-473 | 12/1949 | Japan . |
| 42-6018 | 3/1967 | Japan . |
| 3-48000 | 7/1991 | Japan . |
| 5-6304 | 2/1993 | Japan . |

*Primary Examiner*—H. Grant Skaggs
*Attorney, Agent, or Firm*—Armstrong, Westerman, Hattori, McLeland & Naughton

[57] ABSTRACT

A belt conveyor is provided to feed veneers in the arrow-marked direction in the drawing. A porous transfer belt having numerous of air holes therein is stretched around so as to run above said belt conveyor. Inside the porous transfer belt, a suction hood which has a plurality of small air passages formed in the running direction of the porous conveyor belt is installed to rotatably accommodate a damper further therewithin. The damper makes intermittent rotations to open or close the sucking section such that only a desired veneer is selectively sucked for sort-out transfer with the result that the need for piercing the veneer or defining in advance a gap between each adjacent two veneers is eliminated. Therefore, it is now possible to perform high speed sort-out operations without subjecting the veneer to damage or breakage resulting from tensile strength exerted thereon at the time of defining the gap.

4 Claims, 5 Drawing Sheets

SHEET-LIKE ARTICLE SORT-OUT APPARATUS

BACKGROUND OF THE INVENTION (1) Field of the Invention

The invention relates to an apparatus for sorting out sheet-like articles.

(2) Background Information

Conventionally, treatments of sheet-like articles such as veneers standardized in rectangular forms required that selection be made from numerous sheet-like articles sequentially fed by means of feeding mechanism such as belt conveyors to a desired passage according to quality groups, storage time to be assured, change of storage places and other various needs such that selected sheet-like articles are sorted out to deviate from the desired passage to a different passage. In order to meet the above-mentioned needs, various sort-out devices have been put to actual use.

In an invention titled "thin plate stacking apparatus" disclosed by Japanese Kokoku Pub. No. 29-473, however, gaps are defined between the sheet-like articles to incorporate a direction changer into said gaps with the result that a tensile strength caused by difference of feeding speeds needed at the time of forming a gap makes fragile sheet-like articles subject to breakage.

Another example is an invention titled "Apparatus for Separately Conveying Veneers" disclosed by U. M. Appln. Kokoku Pub. No. 5-6304, in which the apparatus using a pierce transferring member for pierce feeding sheet-like articles has a problem of leaving piercing cuts therein. As disclosed in Pat. Appln. Kokoku Pub. No. 3-48000 (titled "Continuous Veneer Cutting Apparatus"), a displacement of the leading end of a sheet-like article is so large in a sort-out conveyor for sort-out feeding sheet-like articles to forwardly upwardly and forwardly downwardly that the sheet-like articles are subjected to a dynamic lift due to air resistance at the time of sorting out the articles forwardly upwardly and forwardly downwardly with the result that the appartus was made unpractical for high speed operation.

SUMMARY OF THE INVENTION

The present invention has been developed for providing a practical sort-out devise which obviates the above described problems and more particularly proposes to provide a sheet-like article sort-out apparatus, comprising first conveyor means to feed sheet-like articles along a predetermined passage; porous transfer means adapted to run above said first conveyor means; a suction hood provided above said first conveyor means, said suction hood having a sucking section to open in facing relation to sheet-like articles being fed along said predetermined passage by way of said porous transfer means; a damper installed in said suction hood and adapted for intermittent movement to close and open said sucking section, said damper being adapted to slide along said sucking section within said suction hood to open said sucking section for sucking a desired sheet-like article by way of said porous transfer means; and second conveyor means provided downstream of said sucking section of the suction hood to receive said sucked sheet-like article such that said sheet-like article is fed to deviate along a different passage other than said predetermined passage.

BRIEF DESCRIPTION OF DRAWINGS

The invention will be described in more detail by referring to the present invention in which.

DETAILED DESCRIPTION OF PREFERRED EMBODIMENTS

Figure 1:
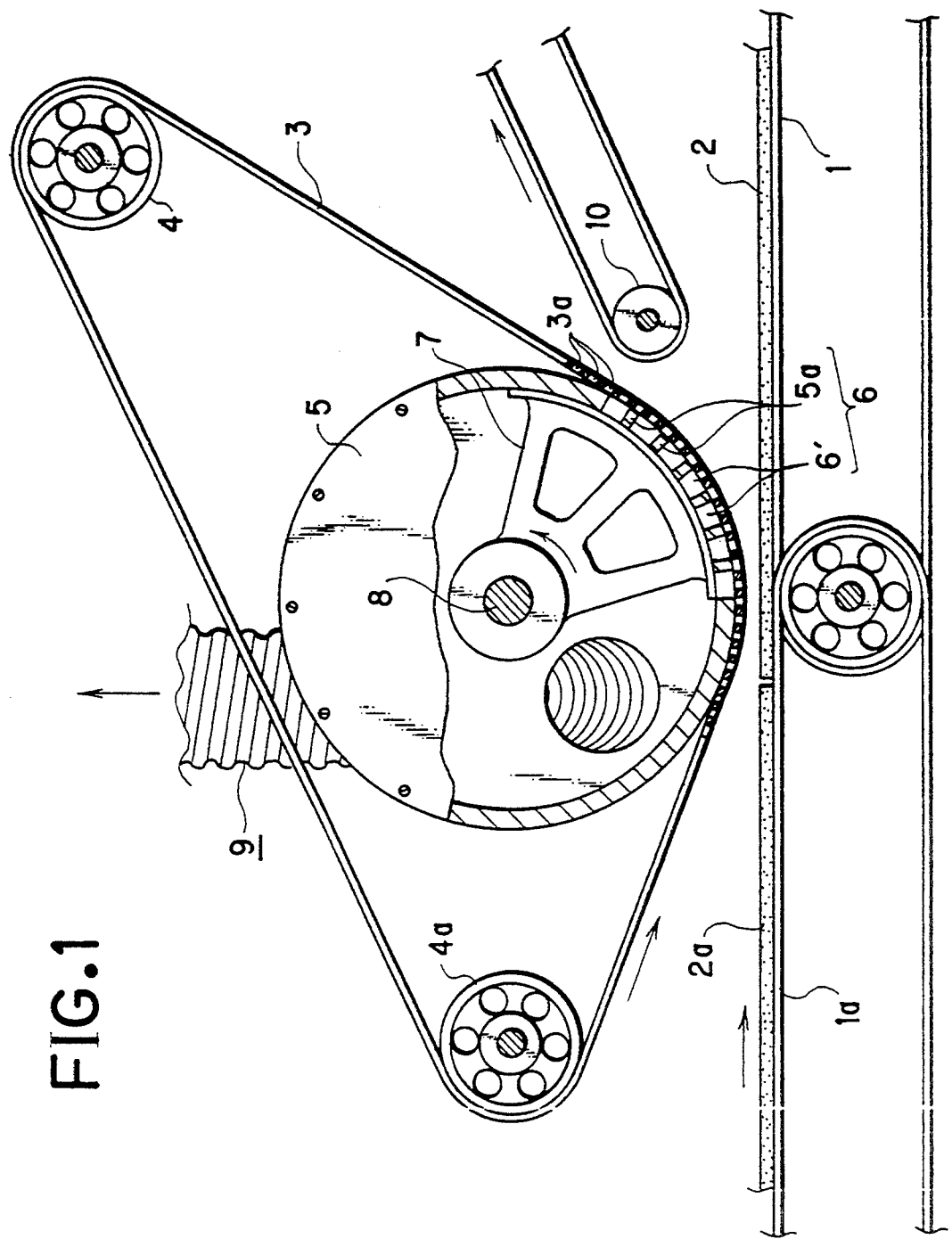
FIG. 1 is a partially fragmentary side elevation of the sort-out apparatus according to the present invention.

In the figures, belt conveyor 1 receives veneers 2, 2a from belt conveyor 1a provided upstream thereof to convey said veneers further along a predetermined passage in the arrow-marked direction.

Porous endless transfer belt 3 having numerous air holes 3a therein is stretched around two rows of pulleys 4 and 4a in whichever row are drive pulleys and in the other row are driven pulleys such that said porous transfer belt 3 runs around in the arrow-marked direction above said belt conveyor 1 and is adapted to slide over the outer openings 6b in the underside of a suction hood 5 which will be described hereinafter.

Suction hood 5 in the form of a hollow cylinder closed at its opposite ends is provided above said belt conveyor 1. Said suction hood 5 is formed with a sucking section 6. Said sucking section 6 includes a plurality of air passages 6' formed with outer openings 6b which open at an area opposite veneers 2 and 2a being fed on the belt conveyor 1 by way of said porous transfer belt 3. Said air passages 6' are provided in finely divided fashion by a plurality of partition walls 5a extending perpendicular to the running direction of the porous transfer belt 3. Said air passages 6' have inner openings 6a formed in an inner periphery of the suction hood 5 to define an imaginary sectioned cylinder surface of a desired diameter (since the hood per se is a hollow cylinder in this embodiment, the inner openings are inevitably provided to follow the sectioned portion of the hollow cylinder inner surface.

Damper 7 includes a boss 7a, arm 7b and rim 7c and is rotatably supported about pivot 8 such that said rim 7c move along inner openings 6a in the sucking section 6 of the suction hood 5. Although not shown in the drawings, said damper 7 is intermittently rotated in the same direction as the veneer feed direction in synchronism with the feed of a desired veneer with the aid of an intermittent drive mechanism composed of a servo motor or the like on the basis of the control by means of a suitable control mechanism which receives a veneer cut signal from a signal source such as a veneer severing apparatus positioned in the preceding stage along the belt conveyors 1 and 1a, a border detecting signal from a sensor which detects the border between veneers, or any manual selection signal depending on the situation required.

Suction hose 9 is provided to connect said suction hood 5 and an air suction device (not shown). The numeral 10 designates a sidetrack belt conveyor for veneers to be sorted out by means of said porous transfer belt 3.

Figure 2:
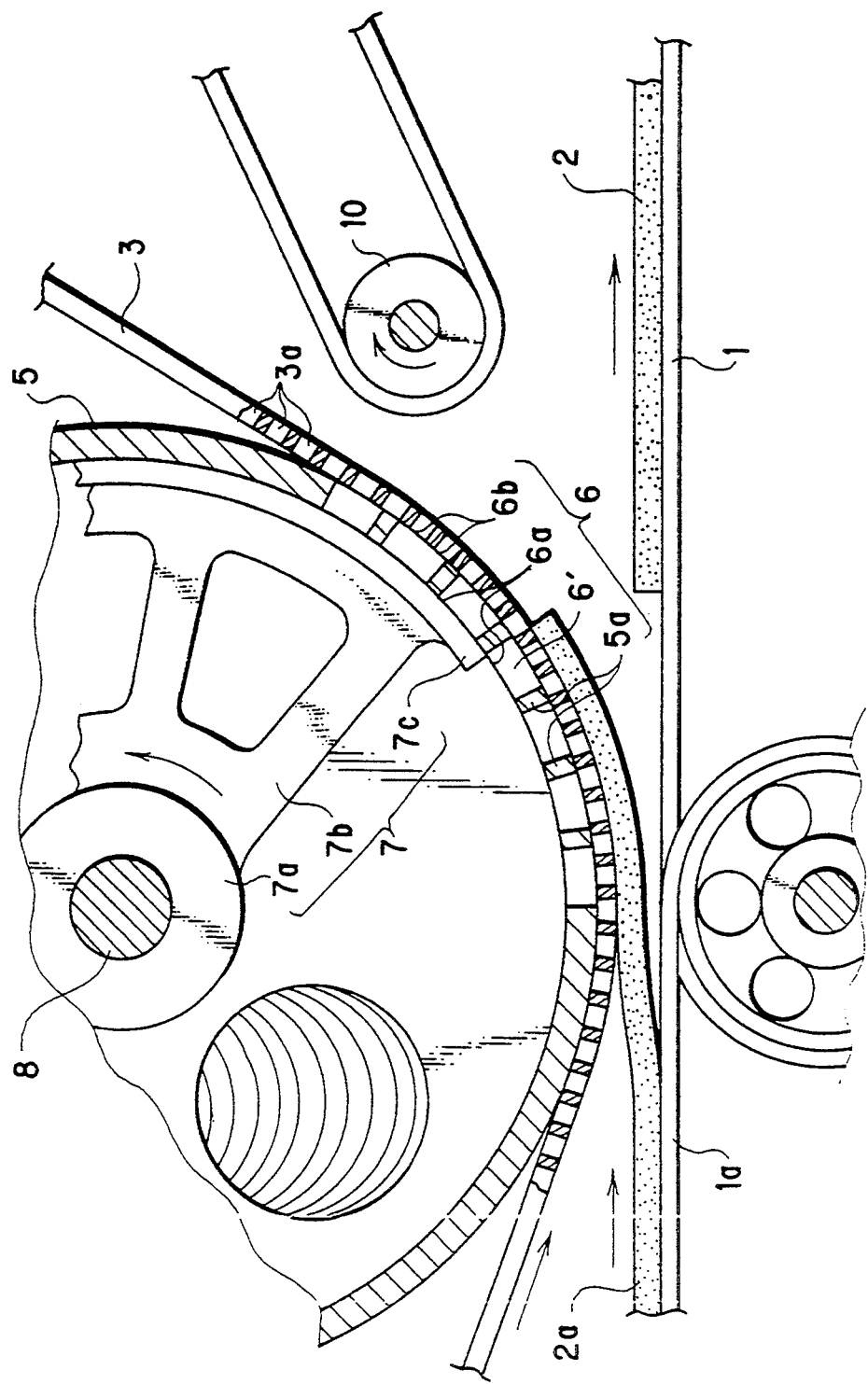
FIG. 2 is an explanatory figure of the elementary portion of the sort-out apparatus of FIG. 1.

The sort-out apparatus according to the present invention is composed as shown above, in which the damper 7 is positioned as depicted in FIG. 1 to close the air passages 6' in the hood 5. In order to sort out a desired veneer, that is, if it is desired to selectively sort out veneer 2a, damper 7 is controlled to rotate in synchronism with the leading end of said veneer 2a as shown in FIG. 2 such that the air passages 6' of the suction hood 5 is opened in sequence to suck the veneer 2a gradually from the leading end thereof to be stick onto the porous transfer belt 3.

Figure 3:
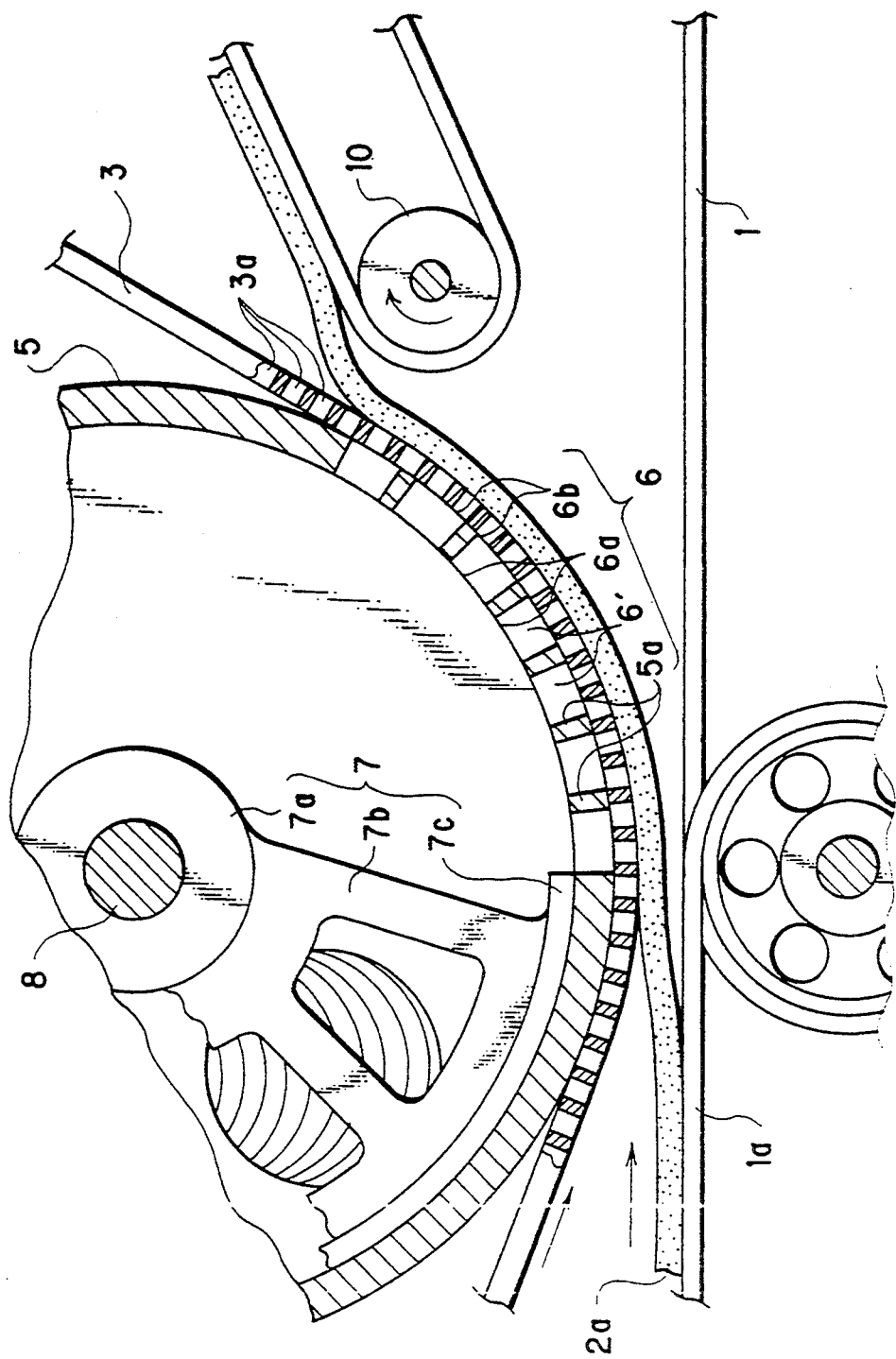
FIG. 3 is another explanatory figure of the elementary portion of the sort-out apparatus of FIG. 1.

Although the air passages 6' in the sucking section 6 of the suction hood 5 is fully opened soon or later, the suction of veneer 2a onto the porous transfer belt 3 by the suction hood 5 is confined to the area where air passages 6' exist. As a result, the veneer 2a is gradually relieved of the suction engagement beginning from the leading edge thereof as said veneer passes the area. Thereafter, the veneer is gradually transferred onto the sidetrack belt conveyor 10. In the meantime, the rotation of damper 7 is controlled to rotate until it stops for a time being after it reaches the position as shown in FIG. 3 to stand by furhter until the trailing end of the veneer 2a passes.

Figure 4:
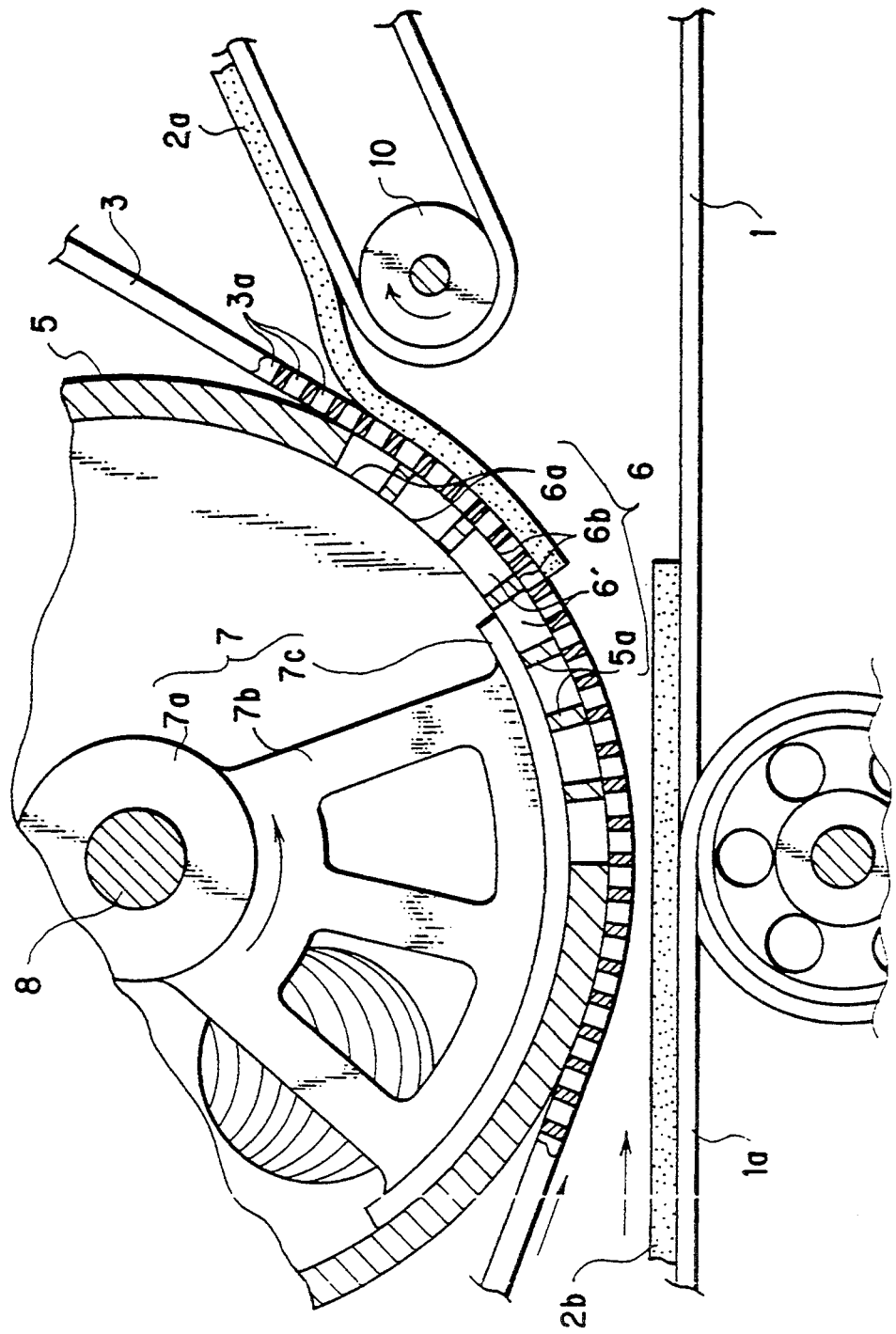
FIG. 4 is a further explanatory figure of the elementary portion of the sort-out apparatus of FIG. 1.

Thereafter, damper 7 is controlled to start rotating in synchronism with the movement of the trailing end of veneer 2a as shown in FIG. 4 to gradually close the air passages 6' of the suction hood 5. Therefore, while only the trailing end veneer 2a is still sucked to the porous conveyor belt 3, the leading end of the succeeding veneer 2b will not be sucked to stick on the porous conveyor belt 3 with the result that said veneer 2b is fed thereafter along the predetermined passage on the belt conveyor 1.

In that case, if the air passages in the suction hood is too large, a required localized closure thereof by means of the damper can be imperfect to such an extent that the leading end of the succeeding veneer is subject to unnecessary suction force. For avoiding such a situation, there is a need for forming gaps between each adjacent veneers. In the above described sort-out apparatus, the sucking section 6 is provided in a divided fashion into a plurality of small air passages to be arranged in the running direction of the porous conveyor belt, the leading end of the succeeding veneer is hardly subjected to any suction force, thus avoiding an erroneous sort-out treatment even if the veneers are continuously fed without gaps therebetween.

Therefore, the sort-out method as described not only is free from a problem of leaving piercing marks in the treated veneers but also there is no need to define a gap between the veneers by differentiating the veneer feeding speed in advance. Therefore, it is possible to continuously feed soft fragile veneers without gaps therebetween. Furthermore, since the displacement of the veneer leading end is so small that there is no room for creating a dynamic lift due to air resistance, thus making high speed treatment possible. In this way, various difficulties existant in conventional sort-out apparatuses have been eliminated such that efficient sort-out treatment is possible.

Figure 5:
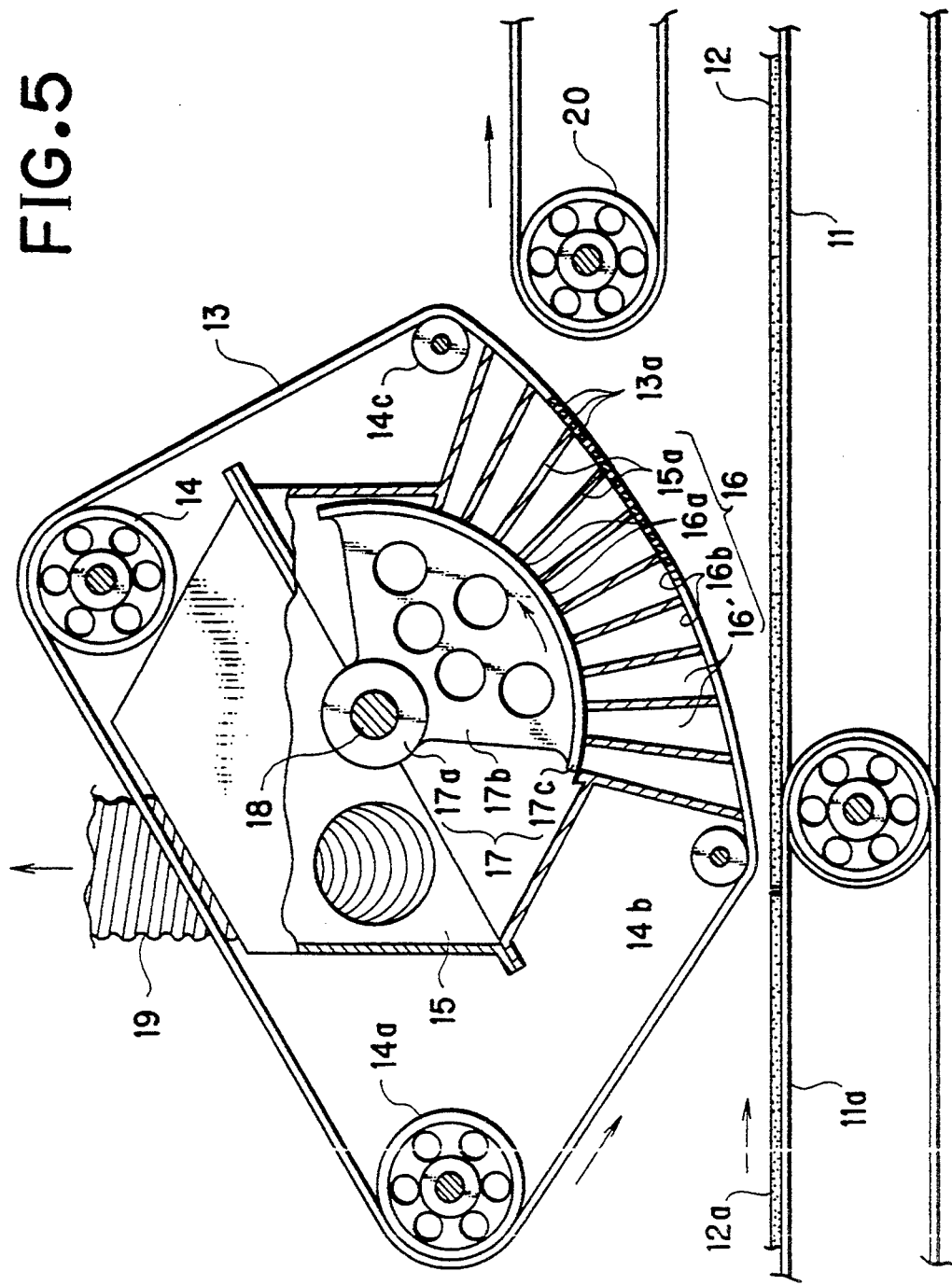
FIG. 5 figure is a partialy fragmentary side elevation of another embodiment of the apparatus according to the present invetion.

In the embodiment shown in FIG. 5, veneers 12 and 12a are fed in the arrow marked direction by belt conveyor 11 after receiving them from belt conveyor 11a like the first embodiment. Above said belt conveyor 11, an arrangement is provided to form a different passage leading to an sidetrack belt conveyor 20. Specifically, porous transfer belt 13 having a number of air holes therein is stretched to run around rows of pulleys 14 and 14a, in whichever row are drive pulleys, and rolls 14b and 14c, which are provided to change the running direction. Further, suction hood 15 of substantially enclosed structure is installed inside the belt conveyor. Said suction hood 15 is formed with a sucking section 16 therein including a hood enlargement at a portion facing veneers being fed along a predetermined passage. Said hood enlargement is provided in a divided fashion in the form of a plurality of air passages 16' to be defined by a plurality of partition walls 15a such that the suction apertures 16 are arranged to extend perpendicularly to the running direction of porous transfer belt 13. Further, damper 17 composed of boss 17a, arm 17b and 17c is installed intermittently rotatably about axis 18.

It is needless to say also in this embodiment that the suction hood 15 is connected to an air suction device (not shown) by way of suction hose 19. Again, the air passages 16' has inner openings 16a which are arranged to define a first imaginary sectioned cylinder surface of a given diameter. Unlike in the foregoing embodiment, however, said air passages 16' have outer openings 16b are arranged to define an imaginary sectioned cylinder surface of a larger diameter than the inner openings 16a. The damper 17 is intermittently rotated to follow the imaginary sectioned cylinder surface defined by the inner openings 16a whereas the porous transfer belt 13 is operated to follow the imaginary sectioned cylinder surface defined by the outer openings 16b. (With this structure, there is no need for a larger treatment space than the foregoing embodiment because small curvature sort-out operation is made possible. Therefore, the apparatus is advantageous in treating relatively hard-to-bend sheet-like articles.

With the apparatus thus structured, the air passages in the hood enlargement are gradually opened by controlling the damper stopped at a depicted position to rotate in synchronism with the movement of the leading end of a desired veneer as in the foregoing embodiment. Accordingly, said desired veneer starts to be gradually sucked begining at the leading end thereof toward the porous transfer belt to stick thereon until said veneer is transferred onto the sidetrack belt conveyor 20. Further, the subsequent damper rotation is stopped immediately before the sucking section for a time, where the damper is controlled to resume rotation in synchronism with the movement of the trailing end of the desired veneer with the result that the air passages in the hood enlargement are sequentially closed. Thus, the succeeding veneer will not be sucked onto the porous transfer belt but continues to be fed on the belt conveyor along the predetermined passage to perform the desired sort-out operation.

In this connection, it is noted that the width of the sort-out apparatus is not required to be perfectly equal to that of sheet-like articles but the apparatus is only required to have a width sufficient to provide proper suction force for performing sort-out operation even if the articles have some shortage or excess in size and even if articles have intermediate portions missing. To meet some necessity, it is possible to perform more than two classes of sort-out operation by aligning substantially plural sets of a suction hood and a damper in series in the running direction of the transfer member. At any rate, there are many other modifications which can be realized as elements for constituting a sort-out apparatus is not confined to the afore-mentioned embodiments. A supplementary explanation will be given as follows.

First, the description with regard to the porous transfer means, will be as follows. The porous transfer belts disclosed in the foregoing embodiments are so rich in elasticity that, even if the outer openings of the air passages in the sucking section or sections of a single or pluralty of suction hoods are arranged without defining imaginary sectioned cylinder surfaces, the belt well runs to follow the general contours of the outer openings without particularly great difficulty, thus constituting a preferable embodiment. In case where, on the other hand, the outer openings of the suction apertures are arranged to define an imaginary sectioned cylinder surface of a given diameter, a rigid cylindrical porous transfer drum can be used as a porous transfer member. All that is needed is a porous transfer member which provides an efficient intermediate medium of the sucking force of the suction hood. Air holes therein are preferably made smaller and in large number with configurations thereof being allowed to be recutangular, oval, circular or in any other shape as long as they are spread all over.

Next, modifications of the suction hood will be discussed hereinafter. There is no limitations in its configuration except for the requirements that the air passages in the sucking section be formed in a finely divided fashion and that the inner openings thereof be arranged to define an imaginary sectioned cylinder surface. For example, the suction hose may be replaced by connecting the hood directly to the air suction devise. The outer openings of the air passages of the sucking section may be designed to define an imaginary sectioned oval cylinder surface to meet an alternative requirement. The designing precision for the damper engagement with the inner openings may be as liberal as that for slide-type dampers in general use. As detailed in the foregoing, a cylindrical porous transfer drum having a rigidity may be used if the outer openings of the air passages in the sucting section are designed to define an imaginary sectioned cylinder surface. However, although the general structure may be simplified, the use of a relatively small diameter porous drum as transfer means in place of the porous transfer belt is not necessarily suitable for space saving in case where the air passages in the hood enlargement are designed to expand outwardly as in the embodiment of FIG. 5.

In the next place, the damper modifications will be discussed. There is no limitations for the configurations as long as the damper has a sufficient size to close the air passages of the sucking section at the time of necessity. As mentioned in the foregoing, the engagement precision with the inner openings of the air passages may be as liberal as the slide type damper in general use. If required, a balance weight may be additionally attached thereto for a balancing purpose.

However, the shape is preferably made as difficult as possible to block the air flow at the time of opening the sucking section.

Needless to say, there is no particular limitation in the use of control mechanism for controlling the afore-mentioned damper rotation. What is needed is the control mechanism which can control the damper to gradually open the air passages the sucking section in synchronism with the movement of the leading end of the desired sheet-like article before the subsequent rotation is temporarily halted immediately in front of the sucking section of the suction hood and then the damper is rotated to gradually close the suction apertures in synchronism with the movement of the trailing end of the desired sheet-like article. Any type of signal source is acceptable and it is possible to adopt a control system which is capable of performing more than two-stage sort-out operations in compliance with the structure of the sort-out device in accordance with needs.

It will be noted that an apparatus according to the present invention positively eliminates any damaging factors to enable high speed sort-out treatments with the result that the thus assured wider application than in the prior art makes the sheet-like article to be treated in a streamlined fashion. In this way, the results obtained from practicing the present invention is extremely useful in this technical field.

What is claimed is:

1. A sheet-like article sort-out apparatus, comprising first conveyor means to feed sheet-like articles along a predetermined passage;

porous transfer means adapted to run above said first conveyor means;

a suction hood provided above said first conveyor means, said suction hood having a sucking section to open in facing relation to sheet-like articles being fed along said predetermined passage by way of said porous transfer means;

a damper installed in said suction hood and adapted for intermittent movement to close and open said sucking section, said damper being adapted to slide along said sucking section within said suction hood to open said sucking section for sucking a desired sheet-like article by way of said porous transfer means; and second conveyor means provided downstream of said sucking section of the suction hood to receive said sucked sheet-like article such that said sheet-like article is fed to deviate along a different passage other than said predetermined passage.

2. A sheet-like article sort-like apparatus according to claim 1, wherein said suction hood includes a hollow cylinder body connected to a suction source, said damper being adapted for intermittent rotation therewithin.

3. A sheet-like article sort-out apparatus according to claim 2, wherein said sucking section includes a plurality of air passages defined by partition walls formed in said hollow cylinder body to extend perpendicular to the running direction of the porous transfer means, said porous transfer means being adapted to slide over an outer periphery of said hollow cylinder body, said air passages having inner openings in an inner periphery of the cylinder body such that said inner openings are arranged to define an imaginary sectioned cylinder surface which said damper follows.

4. A sheet-like article sort-out apparatus according to claim 1, wherein said suction hood is connected to a suction source, said damper is adapted for intermittent rotation therewithin, said sucking section including a hood enlargement formed in said suction hood at a portion facing a sheet-like article being fed along said predetermined passage, said hood enlargement having a plurality of air passages defined by partition walls extending perpendicularly to the running direction of the porous transfer means, said air passages having inner openings arranged to define a first imaginary sectioned cylinder surface of a smaller diameter, said passages having outer openings arranged to define a second imaginary sectioned cylinder surface of a larger diameter, said damper being adapted to follow said first imaginary sectioned cylinder surface, said porous transfer means being adapted to follow said second imaginary sectioned cylinder surface.

* * * * *